United States Patent
Sumi

(10) Patent No.: US 6,671,125 B1
(45) Date of Patent: Dec. 30, 2003

(54) FLUID SEAL AND BEARING WITH SAME

(75) Inventor: Shigeharu Sumi, Shigaken (JP)

(73) Assignee: Nidec Corporation, Kyoto (JP)

( * ) Notice: Subject to any disclaimer, the term of this patent is extended or adjusted under 35 U.S.C. 154(b) by 419 days.

(21) Appl. No.: 09/680,231

(22) Filed: Oct. 6, 2000

(30) Foreign Application Priority Data

Oct. 7, 1999 (JP) ............................................ 11-286735
Mar. 27, 2000 (JP) ...................................... 2000-086042

(51) Int. Cl.[7] .............................. G11B 17/02; H02K 5/10
(52) U.S. Cl. .................................. 360/99.08; 310/67 R
(58) Field of Search .......................... 360/97.02, 97.03, 360/99.08, 99.04, 98.07; 310/67 R, 42, 90, 135, 156.01, 156.04; 277/409, 410, 411, 418, 419, 420, 549, 559, 562, 565, 567

(56) References Cited

U.S. PATENT DOCUMENTS

| | | | |
|---|---|---|---|
| 4,407,508 A | * 10/1983 | Raj et al. ..................... 277/302 |
| 5,051,853 A | 9/1991 | Hosoya .................... 360/99.08 |
| 5,057,952 A | 10/1991 | Takahashi ................ 360/97.02 |
| 5,267,737 A | * 12/1993 | Cossette et al. ............ 277/410 |
| 5,303,935 A | 4/1994 | Saksun ....................... 277/152 |
| 5,493,161 A | 2/1996 | Uno et al. ................... 310/156 |
| 5,675,199 A | 10/1997 | Miyakoshi et al. ........... 310/90 |
| 5,768,051 A | * 6/1998 | Kora et al. ............... 360/99.08 |
| 5,821,646 A | * 10/1998 | Chuta et al. .............. 310/67 R |
| 5,880,543 A | * 3/1999 | Park, II .................... 310/67 R |
| 5,880,545 A | * 3/1999 | Takemura et al. ............ 310/90 |
| 5,949,165 A | * 9/1999 | Sakuragi .................... 310/67 R |

* cited by examiner

Primary Examiner—David L. Ometz
(74) Attorney, Agent, or Firm—McCarter & English

(57) ABSTRACT

A fluid seal is disposed in a radial gap between a shaft of a motor and a hub rotatably held about the shaft, for preventing contaminates such as oil dusts and the like within the motor from leaking to the outside of the motor. The fluid seal has an annular body disposed about the axis of the motor shaft that is fixed to the hub directly or with a fluid seal holder. The annular sealing surface of the annular body is spaced from the outer sealing surface of the shaft by a minute gap, and a sealing portion is formed in the gap. The gap is filled with a fluid having a sufficient barrier pressure to prevent contaminates from flowing out of the motor. The fluid seal may have an approximately concave shape facing the axis of the shaft when the shaft is cut away by a plane passing through the axis of the shaft. This structure prevents the fluid from being scattered due to centrifugal force arising during operation of the motor. The fluid seal also may have an angled seal structure to keep the fluid in against external shocks. A fluid seal built-into a ball bearing is also disclosed.

19 Claims, 5 Drawing Sheets

FLUID SEAL AND BEARING WITH SAME

BACKGROUND OF THE INVENTION

1. Field of the Invention

The present invention relates to a sealing structure for an electric motor, and more particularly, it pertains to a fluid seal which is disposed in a radial gap between a shaft and a hub of a motor for preventing contaminates such as oil, dusts and the like within the motor from leaking to the outside of the motor. In addition, the present invention relates to a spindle motor having such a fluid seal, and a disk drive using such a spindle motor.

2. Description of the Related Art

FIG. 16 schematically illustrates the internal construction of a typical disk drive 70. The disk drive 70 comprises a housing 71 having a motor 72 mounted therein for driving a disk 73 capable of storing various kinds of information in digital format and at high density. The housing 71 also contains a head assembly 77 for reading and writing information to or from the disk plate 73. The head assembly 77 comprises a head 76 for reading and writing information on the disk 73, an arm 75 for supporting the head 76, and an actuator portion 74 for moving the head 76 and arm 75 to a required position. In recent years, the information density capable of being stored on a disk has grown by leaps and bounds. A clean environment for installation and housing of a disk containing extremely little dust is required. Therefore, the inside of the housing 71 of the disk drive 70 has to form an extremely clean space and to this end is shut off from outside air. Also, the motor 72 used in a disk drive may not leak contaminates, such as oil mists and the like. In response to such a demand, fluid seals are used to prevent oil mists and the like that are caused by rotation of the shaft and ball bearing portions of the motor 72.

In FIG. 15, an example of spindle motor with a fluid seal is shown as a cross-sectional view cut away by a plane passing through the shaft axis of the motor. In particular, shaft 1 is fixed and has a rotor hub 4 rotatably disposed thereon by upper and lower ball bearings 2 and 2'. A stator core 10 and a coil 9 are disposed on a bracket 7 which constitutes a stationary portion, that is, the rotor hub 4 has the shape of a so-called outer rotor. A seal portion 3 is situated above the upper ball bearing, and is fitted in between the shaft 1 and the rotor hub 4 so as to fill the gap therebetween.

Hitherto, a magnetic fluid in schematic in FIG. 13 has been used to form the seal portion 3 FIG. 15. Since the magnetic fluid seal has a rotationally symmetrical shape with respect to the alternate long and short dash line exhibiting the shaft axis in the figure, only the right sides of the cross-sectional views cut away by a plane passing through the shaft axis is shown in the Figures below.

The magnetic fluid seal shown in FIG. 13 comprises annular pole pieces 30 and 33 formed by of a pair of magnetic bodies, and an annular magnet 32 sandwiched therebetween. These pole pieces and magnet are disposed above the outer ring portion 21 of the upper bearing 2 via a holder 35, and are fixed by an adhesive 34. The inner peripheral end portions of the pole pieces 30 and 33 confront the outer sealing surface of the shaft with a gap located therebetween. Between the inner end portion of the upper pole piece and the outer surface of the shaft, a magnetic fluid 31 is held by the flux generated by the annular magnet 32, and this forms an air barrier, which prevents dust generated by the rotation of the lower pole or the like from leaking upwardly along the shaft via the above-mentioned gap.

FIG. 14 is an enlarged view of only the fluid seal portion of FIG. 13. Usually, the magnetic fluid 31 is stored between the upper and lower pole pieces and also in the annular concave portion formed on the inner peripheral side of the annular magnet 32. At a standstill, the magnetic fluid 31 is held forming the meniscus indicated by the broken line in FIG. 14.

In recent years, with the increase in the processing speed of personal computers and the like, storage devices used in them, such as magnetic disks, are increasing in storage capacity and the writing/reading speed for storing information is rising by leaps and bounds. In response to such a situation, the magnetic disk or the like is required to have a rotational speed, of for example, more than ten thousand rotations per minute. In such a case, the magnetic fluid held between the inner peripheral end portion of the upper pole piece 30 and the outer peripheral surface of the shaft is attracted by a rotational centrifugal force in the radial outward direction, and forms a meniscus, as indicated for example, by the solid line in FIG. 14. That is, when the spindle motor is at a standstill, the magnetic fluid 31 forms the meniscus indicated by the broken line, but when attracted by the rotational centrifugal force, for example, a part of the upper portion of the meniscus 311 flows up to the magnetic fluid part 312 on the inner end portion of the upper pole piece 30, while a part of the lower portion of the meniscus 313 is pushed back to the part 314 within the annular concave portion on the inner side of the upper and lower pole pieces. As a result, the sealing layer, formed by the magnetic fluid, held between the inner end portion of the upper pole piece 30 and the outer surface of the shaft becomes thin, and the sealing capability, especially the barrier pressure of the seal decreases. In addition, this location is when the barrier pressure of the seal is at the maximum equivalent pressure required to prevent oil mists and the like from flowing out through the fluid seal.

A magnetic fluid seal shown in FIG. 13 has a thickness in the axial direction of several millimeters (e.g., 5 mm or 3 mm), that is, this magnetic fluid seal is a very thin precision component, although it is a complicated component comprising upper and lower pole pieces 30 and 33, an annular magnet 32, a holder 35, and so on. Manufacturing thereof, therefore, requires numerous precision processes, a large number of man-hours, and a high cost.

Furthermore, in response to the recent reduction in thickness of note-book personal computers and the downsizing or weight-reduction thereof intended for an improvement in portability, the downsizing tendency of storage devices, such as magnetic disks and the like, is being increasingly promoted, and a corresponding decrease in thickness of the motors used in these storage devices also is being desired. With respect to the fluid seals, it is therefore also an essential condition to make these thinner than conventional ones.

SUMMARY OF THE INVENTION

Accordingly, it is an object of the present invention to provide a low-profile fluid seal capable of stably maintaining a sealing capability with respect to a high-speed rotation.

It is another object of the present invention to provide a fluid seal having a simple structure and being capable of meeting a high-speed rotation.

It is still another object of the present invention to provide a fluid seal capable of being manufactured with a small number of man-hours and at a low cost.

It is a further object of the present invention to provide a low-profile and low-cost spindle motor capable of meeting a high-speed rotation, and to provide a high-speed rotating disk drive using this motor.

In order to achieve these objects, a fluid seal in accordance with the present invention comprises an annular body having an annular sealing surface confronting the outer sealing surface of a motor shaft with a minute gap therebetween, and a fluid held in this minute gap. In this way, a fluid seal is constructed which has a much simpler structure than that of a conventional magnetic fluid seal.

In addition, in a fluid seal in accordance with a particular embodiment the present invention, the annular sealing surface of the annular body has an approximately concave shape in cross-section. In other words, the nearer to the upper or lower surface of the annular body in an axial direction it may go, the shorter are the distances from the annular sealing surface of the annular body to the axis of the shaft. One advantage of this structure is that it prevents the sealing fluid from being scattered by rotational centrifugal force, and achieves a stable sealing capability even under conditions of high-speed rotation.

In a fluid seal in accordance with another embodiment of the present invention, the outer sealing surface of the shaft has an annular approximately convex shape in cross-section. The annular convex part has an annular tip that is located at a central portion thereof. The annular tip makes contact with the fluid held in a cavity of the approximately concave portion formed on the annular sealing surface of the annular body of the fluid seal. This provides a fluid-sealing structure that maintains a fluid-sealing capability even with a small quantity of fluid.

Also, a fluid seal in accordance with another embodiment of the present invention has an angled sealing structure in which the cross-sectional shape thereof is opened in opposed directions, or upwardly and downwardly. This permits the fluid held in this angled sealing gap to be stably held without being scattered, even when subject to external shocks.

The fluid sealing structure described above can also be applied to a sealing portion provided between an inner ring and an outer ring of a ball bearing (a fluid seal is generally fixed to the inner surface of the outer ring). Specifically, a fluid seal in accordance with another embodiment of the present invention comprises an annular body having an inner surface confronting the outer surface of the inner ring with a minute gap therebetween, and a fluid held in this minute gap. In addition, in a fluid seal in accordance with another embodiment of the present invention, the inner surface of the annular body constituting a fluid seal has an approximately concave shape opened to the axis of the shaft in cross-section when it is cut away by a plane passing through the axis of the shaft. In a fluid seal in accordance with a further embodiment of the present invention, the outer sealing surface of the inner ring has an annular approximately convex part. The annular approximately convex shape has an annular tip which is located at the central portion in the axial direction of the part confronting the above-mentioned approximately concave shape. Also, a further embodiment includes an angled sealing structure in which the cross-sectional shape thereof is opened in opposing directions, or upwardly and downwardly, in the axial direction between the annular sealing surface of the annular body and the outer sealing surface of the inner ring. By these structures, a ball bearing with a seal capable of high stability can be attained even under high-speed rotational conditions.

Furthermore, in accordance with the present invention, a spindle motor is realized which has the above-described fluid seal or ball bearing with the fluid seal. Accordingly, there is provided a low-profile and low-cost spindle motor capable of stably achieving a sealing capability under high-speed rotational conditions. Moreover, in still a further embodiment of the present invention, a disk drive using this spindle motor is realized. Accordingly, there is provided a disk drive having a high data transfer speed as a result of the high-speed rotation.

The above and other objects, features and advantages of the present invention will be apparent from the following detailed description of the preferred embodiments of the invention in conjunction with the accompanying drawings.

DESCRIPTION OF THE PREFERRED EMBODIMENTS

Figure 15:
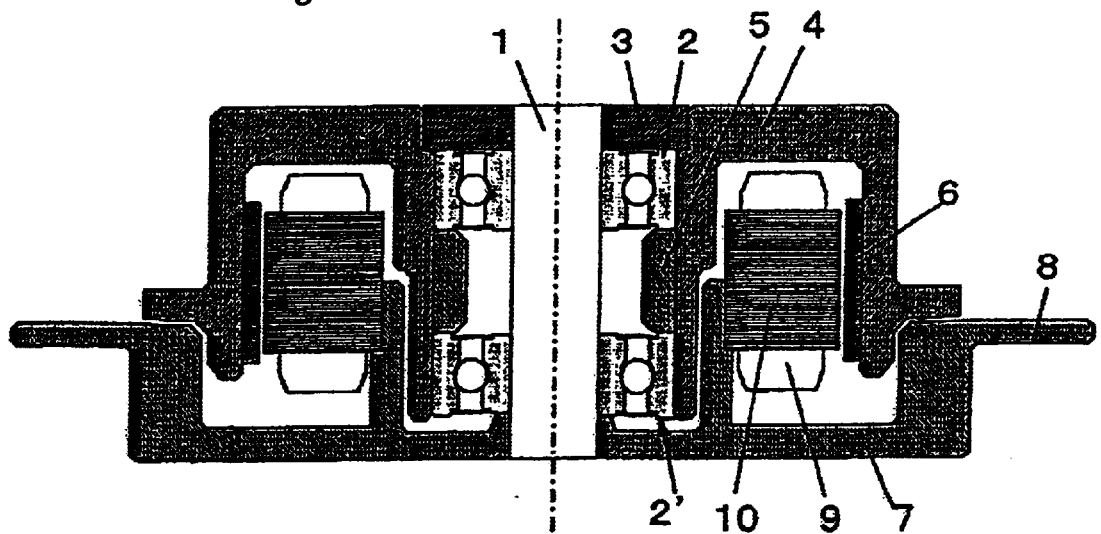
FIG. 15 is a cross-sectional view showing an example of a spindle motor capable of employing a fluid seal in accordance with the present invention.
Figure 16:
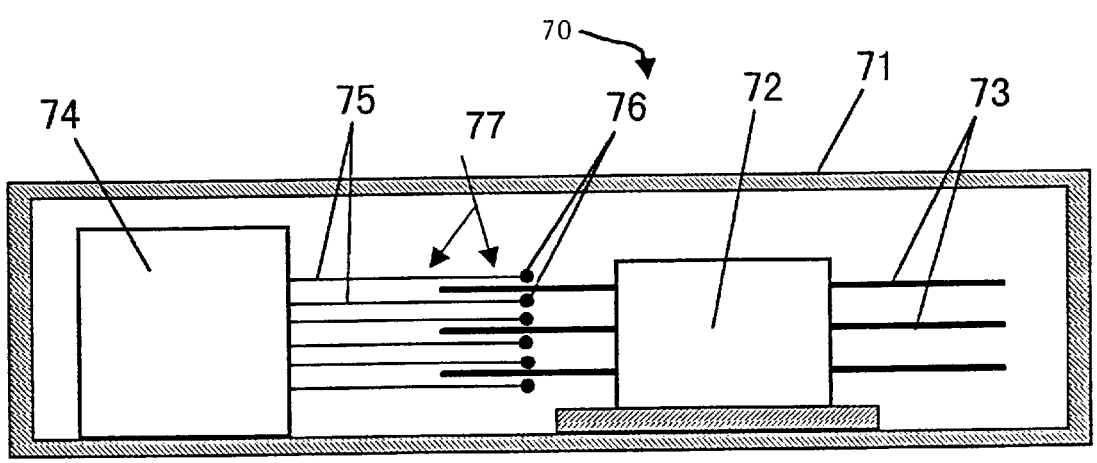
FIG. 16 is a schematic view showing the internal construction of a typical disk drive.

The construction of the fluid seal in accordance with the present invention will be described below in detail with reference to enlarged views of a portion of, with reference to FIG. 15, a shaft 1, an upper ball bearing 2, and a fluid seal 3 provided thereabove, of a fixed shaft type motor. Hereinbelow, the term "a cross-sectional surface" represents a cross-sectional surface when cut away by a plane passing through a central axis 110 of the shaft 1.

First Embodiment of the Fluid Seal

Figure 1:
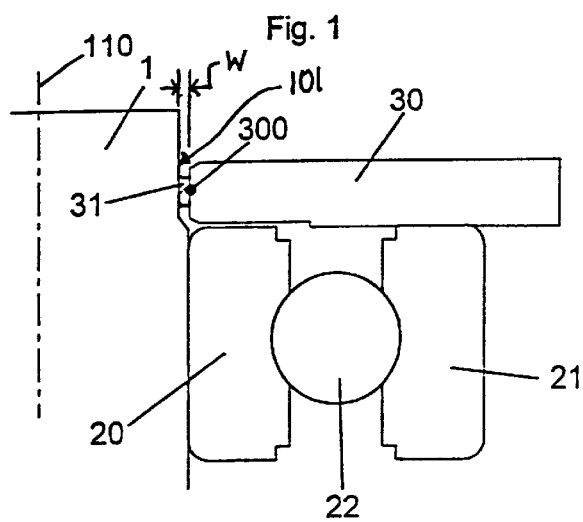
FIG. 1 is a cross-sectional view, showing a portion of the structure of a motor cut away by a plane passing through the shaft axis and comprising a fluid seal in accordance with a first embodiment of the present invention.

In FIG. 1, the structure of a fluid seal in accordance with the first embodiment of the present invention is shown. An annular body or plate 30 constituting the main body of a fluid seal is disposed substantially orthogonally with respect to the axis 110 of the shaft 1. An annular sealing surface 300 of the annular plate 30 confronts the outer sealing surface of the shaft 1 forming a substantially uniform minute gap therebetween. In an upper ball bearing 2 above the motor, the inner ring 20 thereof is fixedly engaged with the outer sealing surface of the shaft 1, while the annular plate 30 is fixedly adhered on the upper portion of the outer ring 21 of the ball bearing. A fluid 31 is held by the surface tension thereof between the inner end portion 300 of the annular plate 30 and the outer sealing surface 101 of the shaft 1.

The surface tension acting on this fluid should be larger than the centrifugal force acting on such fluid during a steady rotation. To achieve this, the minute gap between the annular sealing surface of the annular plate and the outer sealing surface of the shaft is arranged to be narrower than conventional magnetic fluid seals. The volume of the fluid held in this sealing portion, therefore, requires a smaller quantity than that held by the conventional magnetic fluid seals. Accordingly, the magnitude of centrifugal force acting on the total volume of the fluid during rotation is also smaller than in the case of the conventional magnetic fluid seals. Accordingly, as used herein, the term "minute gap" refers to a gap which is sized such that when filled with a fluid, such as a liquid, the fluid will form a seal through surface tension that forms a barrier that is sufficient to prevent contaminates such as oil mists and the like from flowing out through the seal. The width (W) of the minute gap is preferably within the range of approximately 0.005 millimeters (hereafter "mm") through approximately 0.2 mm and most preferably within the range of between approximately 0.02 mm through approximately 0.1 mm.

This fluid layer prevents contaminates, including dusts, oil mists, or the like generated by rotation of the balls 22 of the ball bearing 2 during rotation of the motor, from flowing outwardly of the motor (i.e., into the inside of the disk drive or the like).

Figure 14:
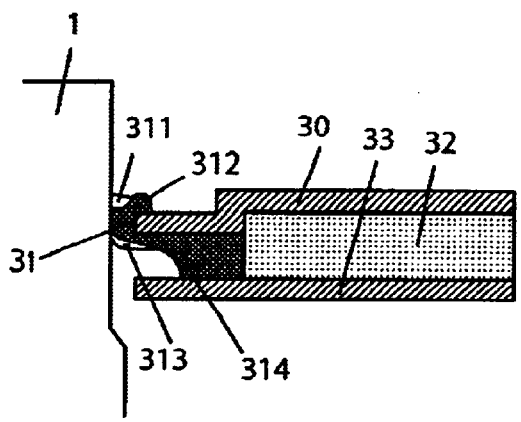
FIG. 14 is an enlarged view of a portion of FIG. 13.

In this embodiment, with respect to a motor of which the shaft 1 has a radius of, for example, 5 mm, the thickness of the annular plate as measured along the annular sealing surface in a direction generally parallel to the shaft axis 110 is within the range of about 1.5 mm to about 2.0 mm, and the quantity of fluid held in this case is about 1 $\mu$l. Among conventional magnetic fluid seals, there are also ones each of which has an annular plate with a thickness to such an extent. However, in the case of a conventional magnetic fluid seal, as shown in FIG. 14, the annular plate thereof has a complicated structure in which it comprises upper and lower pole pieces 30 and 33, and an annular magnet 32 disposed between the pole pieces and having a thickness of, for example, 2 mm, and the manufacturing of the annular plate thereof must be precisely completed. In the present invention, the portion corresponding to this is formed of a one piece annular plate, which permits a fluid seal having a much simpler structure than conventional ones to be realized. As a result, thinner fluid seals also can be realized.

In this embodiment, since the gap of the fluid holding portion is set to a small value and the quantity of the fluid to be held is reduced, a stable fluid seal capable of sufficiently maintaining a barrier pressure of the seal even at a high-speed rotation, can be attained. By using such a seal, therefore, it is possible to realize a fluid seal which is more resistant to failure and lower in cost than conventional fluid seals because of the simpler structure thereof, and which can meet a high-speed rotation, and it also possible to realize a spindle motor using this fluid seal.

In this embodiment, the internal structure and material of the annular plate 30 is not particularly limited. For example, one may be formed of a three-layered structure extending, e.g., in a direction generally parallel to the axis 110, or one formed of only a single material instead may be used. Also, the annular plate 30 may be composed of a metallic substance, a resin such as a rigid plastic, or a ceramic.

On the other hand, in order to realize the capability directly related to the present invention, as a fluid to be used, any fluid having at least a surface tension sufficient to be held, and at least capable of maintaining a barrier pressure of the seal even under high-speed rotational conditions, may be employed. To secure a stable operation with respect to a high-speed rotation inherent in the motor, it is, of course, necessary for this fluid to have low evaporative characteristic, be capable of withstanding a high temperature during rotation, and so on.

A lubrication oil is preferably used as the above-described fluid in accordance with the present invention. Thus, even though the fluid is scattered out of this fluid seal during high-speed rotation, it is absorbed by the ball bearing situated directly underneath the fluid seal. Since the fluid is a lubricating oil, however, this exerts no adverse effect on the ball bearing, and consequently to the motor. Thus, a more stable fluid seal for use in a spindle motor is achieved.

Second Embodiment of the Fluid Seal

Figure 2:
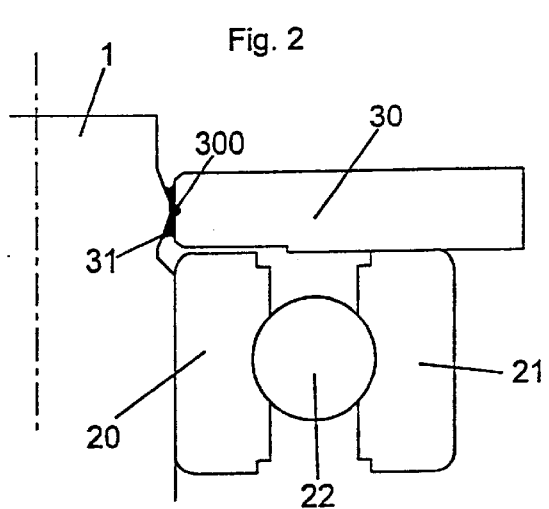
FIG. 2 is a view similar to FIG. 1 showing a fluid seal in accordance with a second embodiment of the present invention.
Figure 3:
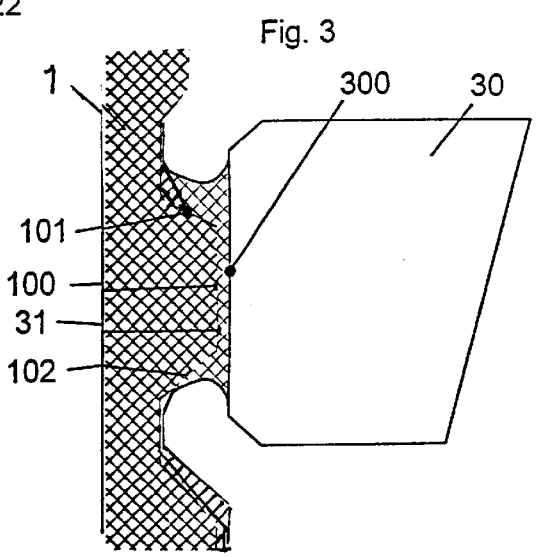
FIG. 3 is an enlarged view of a portion of FIG. 2 showing the fluid seal in accordance with the second embodiment of the present invention.

In FIG. 2, the cross-sectional structure of a fluid seal in accordance with a second embodiment of the present invention is shown. Also, in FIG. 3, an enlarged view of the vicinity of the inner end portion of the annular plate 30 of a fluid seal 3 is shown. In this embodiment, angled seal portions 101 and 102 are formed between the outer sealing surface of the shaft 1 and an annular sealing surface of the annular plate 30, confronting each other. The angled seal portions 101 and 102 have a configuration such that, when the position 100 opposing the center of the annular sealing surface 300 in the shaft axis direction, is designated the center of the plane of symmetry, the gap between the two opposed walls gradually widens as the angled portions move away from the central position 100 in opposing directions (or upwardly and downwardly). A fluid 31 held by these angled seal portions forms a meniscus as shown in FIG. 3. Because of this structure, the fluid 31 has a stable surface tension that prevents the scattering of the fluid caused by external shocks and the like. Accordingly, the fluid is held in a quantitatively stable state for a long period. This permits a fluid seal stably maintaining a sealing capability for a long period to be realized.

In this embodiment, the central portion 100 of the shaft 1 is generally flat while angled seal portions 101 and 102 extend on opposing sides of the central portion at acute angles thereto to form an approximately convex, angled configuration. The angled configuration, however, is not limited to this type. For example, an angled seal configuration may be used wherein there is no flat portion in the vicinity of the central portion 100, wherein the central portion 100 forms the apex of a cross-sectional triangle, and wherein an angled sealing structure corresponding to the two sides of the triangle are formed on the upper and lower sides of the central portion. Optionally, although not shown in the figures, another type of angled seal configuration may be used wherein the central portion 100 forms the apex of an arc, an elliptical arc, other curvilinear surface, and wherein as discussed above, the gap between the confronting surfaces is widened as the angled portions move away from the central portion.

It will be recognized that the angled structure may be formed only by the angled portions on an annular sealing surface of the annular plate 30 of the fluid seal, or the angled structure may be formed by utilizing the mutual effect between the angled portion of the outer sealing surface of the shaft and that of the annular sealing surface of the annular plate.

Third Embodiment of the Fluid Seal

Figure 4:
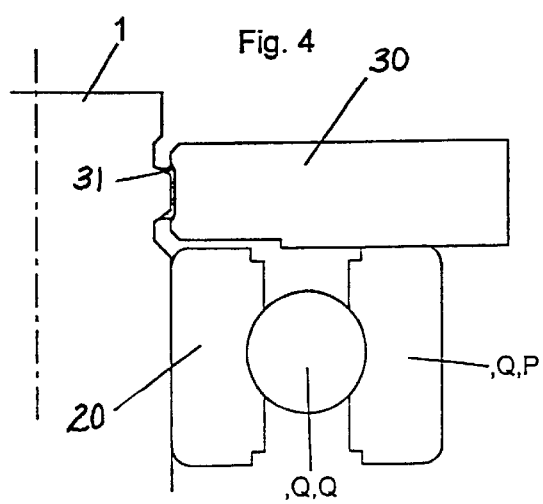
FIG. 4 is a view similar to FIG. 1 showing a fluid seal in accordance with a third embodiment of the present invention.
Figure 5:
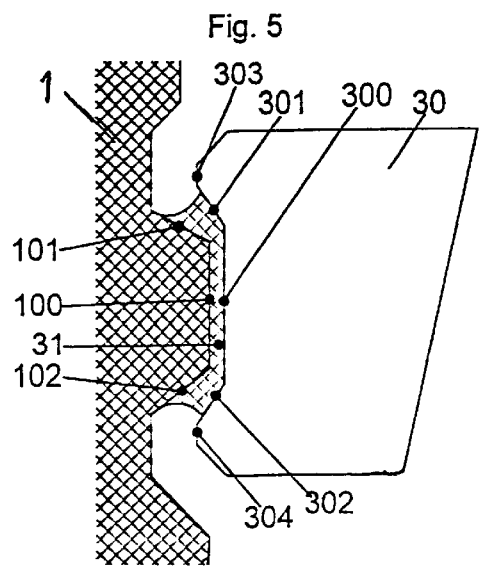
FIG. 5 is an enlarged view of a portion of FIG. 4 showing the fluid seal in accordance with the third embodiment of the present invention.

In FIG. 4, the cross-sectional structure of a fluid seal in accordance with a third embodiment of the present invention is shown. In FIG. 5, an enlarged view of the vicinity of the annular sealing surface of the annular plate 30 of the fluid seal 3 is shown. In this embodiment, in addition to the angled sealing structure formed on the outer sealing surface of the shaft, the annular sealing surface of the annular plate 30 is also provided with cross-sectional angled walls 301 and 302 as can be seen, the vertical distance from the axis 110 of the shaft 1 to an observed point on the surface of the angled wall 301 and 302 decreases as the observed point is shifted away from the central portion of the annular sealing surface 300 upwardly and downwardly. The fluid flowing out in the radial outward direction due to a centrifugal force during the rotation of the motor, is subjected to a force toward the central portion of the annular sealing surface 300 of the inner peripheral end portion of the annular plate 30 by these angled walls. Because of these angled walls 301 and 302, the centrifugal force caused by a high-speed rotation acts so as not to scatter the fluid 31, but so as to collect the fluid to the central portion of the annular sealing surface 300 of the inner peripheral end portion of the annular plate 30. This results in the realization of a fluid seal capable of maintaining a barrier pressure of the seal stable even under high-speed conditions. Hereinbelow, this structure is referred to as an "anti-centrifugal force structure."

Here, the annular angled walls 301 and 302 may start with the central portion of the annular sealing surface 300 of the inner end portion of the annular plate 30 and may be formed in opposing directions (or upwardly and downwardly). Optionally, a certain range of flat portion may be formed at the central portion, and the annular angled walls 301 and 302 may be formed on the opposing, or the upper and lower sides of the flat portion. Preferably, these angled walls 301 and 302 extend up to the upper and lower ends of the annular sealing surface of the annular plate 30. The object of this is to form a fluid portion having sufficient thickness in the axial direction by holding the fluid in substantially the entire annular sealing surface of the annular plate. Obviously the angled walls 301 and 302, however, may be formed on the annular sealing surface spaced from the upper and lower ends of the annular plate.

In the third embodiment, the angled sealing structure explained in the above-described second embodiment is formed based on the interrelationship between the angle of the angled walls 301 and 302 formed at the inner end portion of the annular plate 30, and the angled portions 101 and 102 formed on the shaft surface confronting the angled walls 301 and 302. The angled sealing structure generally has a structure such that the distance in the radial direction between the shaft surface and the inner end surface of the annular plate at an observed point increases gradually as the observed point is shifted away from the central portion 100 or 300 upwardly and downwardly. In this embodiment, therefore, the upper angled seal is formed by the angled portion 101 on the shaft surface and the angled wall 301 formed on the inner end surface of the annular plate 30, while the lower angled seal is formed by the angled portion 102 on the shaft surface and the angled wall 302 formed on the inner end surface of the annular plate 30. As a result, the fluid is stably held in the fluid seal by the surface tension, and this prevents the fluid from being scattered by external shocks or the like.

Furthermore, in this embodiment, the tip portion 100 of the cross-sectional convex portion formed on the outer sealing surface of the shaft is formed so as to have substantially the same radius with respect to the shaft axis as those of the opposed, or upper and lower wall tip portions 303 and 304 of the cross-sectional, concave portion formed at the annular sealing surface of the annular plate 30.

This structure facilitates forming and maintaining a fluid seal between the outer sealing surface of the shaft and the annular sealing surface of the annular plate. In addition, even when the quantity of the fluid decreases for some reason, a small quantity of fluid collected on the annular sealing surface 300 of the annular plate 30 by a rotational centrifugal force permits the tip portion 100 of the outer sealing surface of the shaft to make contact with the fluid, which results in the formation of a seal structure. Thereby, a spindle motor stably maintaining a sealing capability for a longer period can be realized.

In order to enhance this effect, it is preferable that the radii from the shaft axis to the upper and lower wall tip portions 303 and 304 with respect to the shaft axis be smaller than the radius from the shaft axis to the tip portion 100 of the cross-sectional convex portion formed on the outer sealing surface of the shaft. In such a structure, it may be necessary to substantially equalize the radii of the tip portions with respect to the shaft axis to prevent interference occurring between the tip portions during the assembling of the fluid seal.

Other Embodiments of the Fluid Seals

Figure 6:
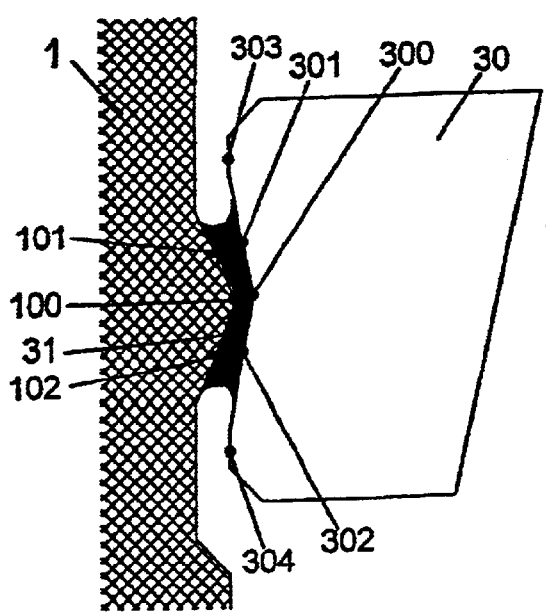
FIG. 6 is a cross-sectional view showing a fluid seal in accordance with a fourth embodiment of the present invention.
Figure 7:
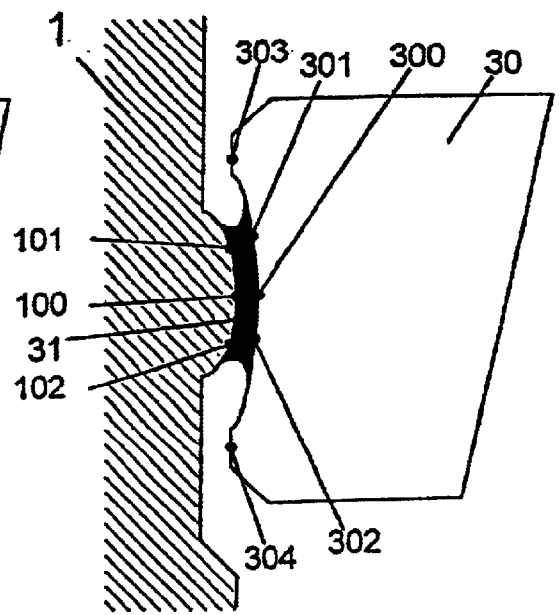
FIG. 7 is a cross-sectional view showing a fluid seal in accordance with a fifth embodiment of the present invention.
Figure 8:
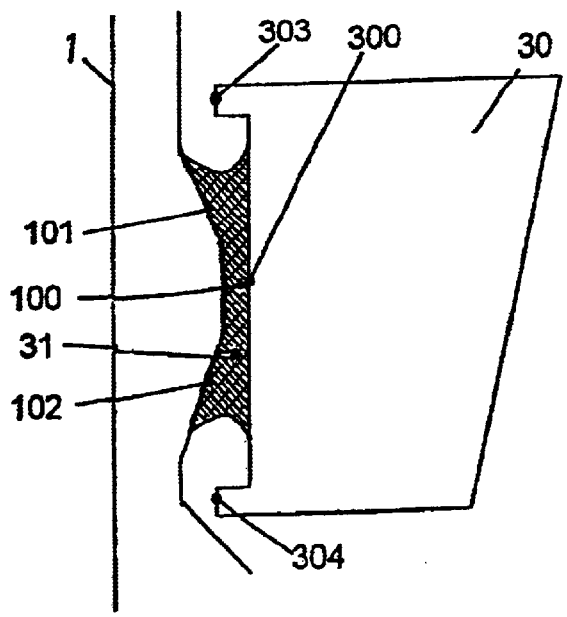
FIG. 8 is a cross-sectional view showing a fluid seal in accordance with a sixth embodiment of the present invention.

The above-described third embodiment can be applied to other embodiments shown in FIGS. 6 through 8.

In FIG. 6, the cross-sectional structure of a fluid seal in accordance with a fourth embodiment of the present invention is shown. As shown therein, the shape of the cross-sectional angled portion formed on the shaft surface and the annular sealing surface of the annular plate 30 which realize the above-described angled sealing structure and anti-centrifugal force structure, are triangles. In this case, the angled portions 301 and 302 of the inner end surface correspond to the anti-centrifugal force structure. Also, the portions formed of the angled portion 101 on the outer sealing surface of the shaft and the angled portion 301 of the annular plate, and the portions formed of the angled portion 102 on the outer sealing surface of the shaft and the angled portion 302 of the annular plate, each correspond to the angled sealing structure. Moreover, in this case, the tip portion 100 of the angled portion on the shaft surface is formed so as to have substantially the same radius with respect to the shaft axis as those of the upper and lower wall tip portions 303 and 304 of the cross-sectional concave portion formed on the annular sealing surface of the annular plate 30. This facilitates securing a sufficient barrier pressure of the seal. In addition, even when the quantity of the fluid decreases, a small quantity of fluid collected on the bottom of the annular sealing surface 300 of the annular plate 30 by a rotational centrifugal force permits forming a seal structure, having a stable sealing capability for a longer period.

In FIG. 7, the cross-sectional structure of a fluid seal in accordance with a fifth embodiment of the present invention is shown. In this embodiment, the shape of the cross-sectional angled portion formed on the shaft surface and the annular sealing surface of the annular plate 30 that form the angled sealing structure and anti-centrifugal force structure, are semicircles or semiellipses. In this case also, as in the case of the above-described fourth embodiment, arc portions or elliptic arc portions 301 and 302 of the inner peripheral end face correspond to the anti-centrifugal force structure. Also, the arc portion or the elliptical arc portions 101 on the shaft and the arc portion or the elliptical arc portion 301 on the annular plate 30, and the arc portion or the ellipse portion 102 on the shaft and the arc portion or the ellipse portion 302 on the annular plate 30 each correspond to the angled sealing structure. Moreover, in this case, the tip portion 100 of the arc portion or elliptical arc portion on the shaft surface is formed so as to have substantially the same radius with respect to the shaft axis as those of the upper and lower wall tip portions 303 and 304. This facilitates securing a sufficient barrier pressure of the seal. In addition, even when the quantity of the fluid decreases, a small quantity of fluid collected on the annular sealing surface 300 of the annular plate 30 by centrifugal force permits forming a seal structure having a stable sealing capability for a longer period.

In FIG. 8, the cross-sectional structure of a fluid seal in accordance with a sixth embodiment of the present invention is shown. Similar to that described above, the angled sealing structure is formed by the cross-sectional angled portions 101 and 102 provided on the outer sealing surface of the shaft. On the other hand, as an anti-centrifugal force structure, walls 303 and 304 are provided for preventing fluid scattering by centrifugal forces and are formed on the annular sealing surface of the annular plate 30. In general, accurate machining for angled portions takes much time, and leads to an increased cost. In this embodiment, however, the machining of the angled portions of the annular sealing surface of the annular plate which is hard to machine, is eliminated. Simply by forming the upper and lower walls, an anti-centrifugal force structure is attained which is substantially equivalent to that in the case where the angled portions are formed. Accordingly, it is possible to realize a seal portion capable of stably meeting high-speed rotation more simply and at a lower cost.

Figure 9:
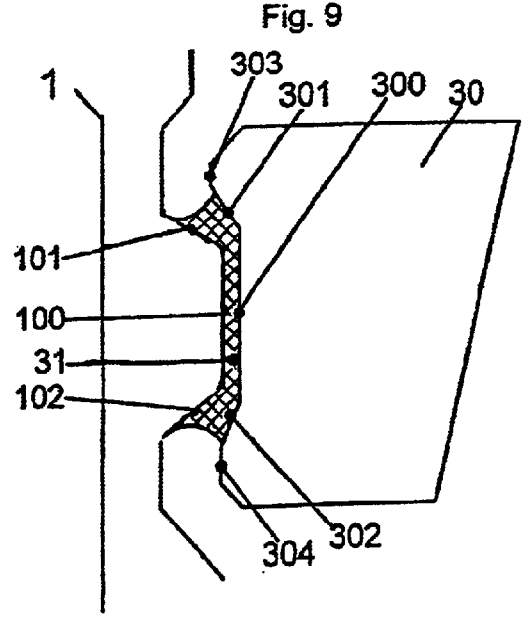
FIG. 9 is a cross-sectional view showing a fluid seal in accordance with a seventh embodiment of the present invention.

In FIG. 9, the cross-sectional structure of a fluid seal in accordance with a seventh embodiment of the present invention is shown. In addition to the features of the above-described third embodiment, this embodiment has an additional feature in which, out of the upper and lower wall tip portions 303 and 304, the lower wall tip portions 304 adjacent to the ball bearing has a slightly shorter radius with respect to the axis than that of the upper wall tip portion 303, as shown in FIG. 9. Thus, even if the fluid leaks for some reason, it is absorbed by the ball bearing. Since a lubricating oil is generally used as the fluid, this leaked fluid exerts no adverse effect on the ball bearing, and consequently to the motor. Thus, a more stable fluid seal and spindle motor can be achieved.

Of course, the above-described angled portion or wall portion may be constructed by using various structures as described above. For example, an embodiment in accordance with the present invention may be achieved by combining the triangular shape of the outer sealing surface of the shaft shown in FIG. 6 and the arc shape or the elliptical arc shape on the annular sealing surface side shown in FIG. 7.

Hereinabove, embodiments of the present invention illustrate fluid seals that are applied to the spindle motor wherein the shaft is fixed and the hub rotates. The fluid seal in accordance with the present invention may, however, be applied to a rotating body wherein, conversely, the shaft rotates and the hub is stationary (fixed). Generally, in a shaft-rotating type fluid seal, the centrifugal force acting on a fluid is much smaller than that in the case of a fixed-shaft type fluid seal. In the shaft-rotating type fluid seal, therefore, it is possible to attain a fluid seal realizing a stable sealing capability with respect to a more high-speed rotation than in the case of the fixed-shaft type fluid seal. Needless to say, this shaft-rotating type fluid seal can be applied to the embodiments corresponding to FIG. 1 through FIG. 9.

Embodiments of Ball Bearings with the Fluid Seal

Since each of the fluid seals described above has a more simple structure than those of conventional magnetic fluid seals, each can be located in between the outer ring and the inner ring of a ball bearing. Accordingly, in accordance with another embodiment of the present invention, a ball bearing with a fluid seal will now be described.

Figure 10:
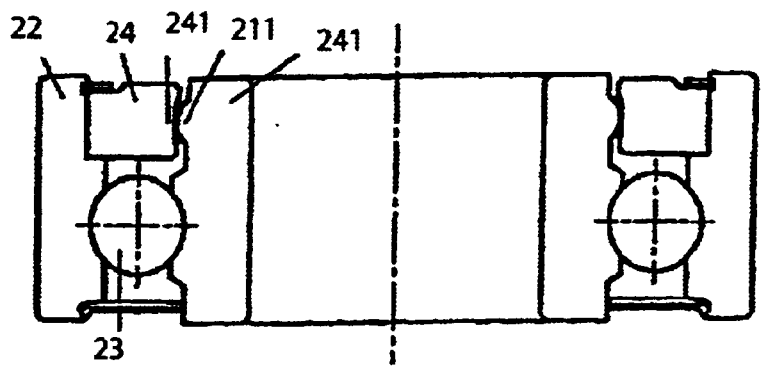
FIG. 10 is a cross-sectional view, showing a portion of a motor including a ball bearing having a fluid seal in accordance with another embodiment of the present invention.

In FIG. 10, the cross-sectional structure of a ball bearing in accordance with one embodiment of fluid seal is shown. An annular plate 24 forming a fluid seal is closely fixed to an outer ring 22 of a ball bearing and above the balls 23. In this embodiment, a fluid such as an oil is held in a minute gap formed between the annular sealing surface of the annular plate and the outer sealing surface of the ball bearing inner ring 21. An annular convex portion 211 is formed on the outer sealing surface of the ball bearing inner ring 21 forming a fluid seal, and an annular concave portion 241 is formed in the annular sealing surface of the annular plate 24 and defines the annular sealing surface confronting the outer sealing surface of the ball bearing inner ring 21. The annular convex portion 211 and the annular concave portion 241 mutually form an angled sealing structure. This angled seal prevents the fluid held in the minute gap from being scattered by external shocks, and can achieve a ball bearing stably maintaining a sealing capability for a longer period.

Figure 11:
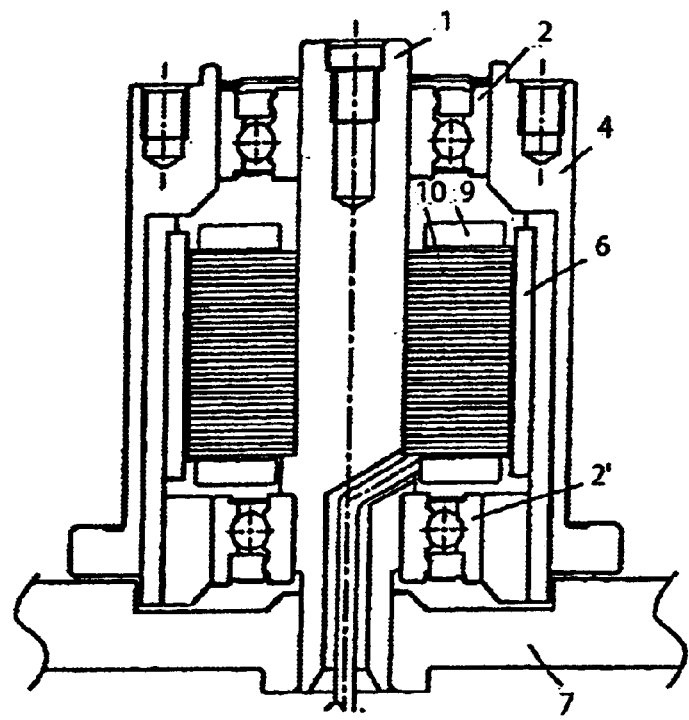
FIG. 11 is a cross-sectional view showing a motor using a pair of ball bearings with fluid seals in accordance with the present invention.

In FIG. 11, one embodiment of a motor utilizing this ball bearing with the fluid seal is shown. In this figure, the same parts as those in the motors shown in FIG. 15 are identified by the same reference numerals. The ball bearings 2 and 2' with a fluid seal in accordance with the present invention are installed in the orientation such that the respective sealing portions are disposed on the outside of the motor. Thereby, the fluid seal prevents contaminants such as oil mists occurring around the ball bearing due to the rotation of the motor, or dust within the motor, from flowing out of the motor.

The motor shown in FIG. 11 is a fixed-shaft type motor in which a shaft 1 is stationary and a rotor hub 4 rotates. As the motor rotates, fluid held in the sealing portion is subjected to a rotational centrifugal force in the radial outward direction. This fluid is, however, caught by an annular concave portion 241 formed in the inner peripheral surface of an annular plate 24 forming a fluid seal, and is further contained in the concave portion by centrifugal force. This permits the construction of a stable fluid seal that prevents oil scattering even under high-speed rotational conditions.

Figure 12:
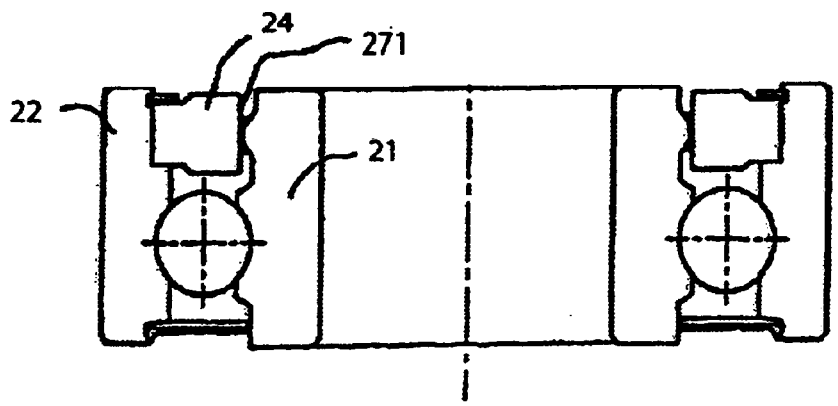
FIG. 12 is a view similar to FIG. 10 showing a ball bearing having a fluid seal in accordance with still another embodiment of the present invention.
Figure 13:
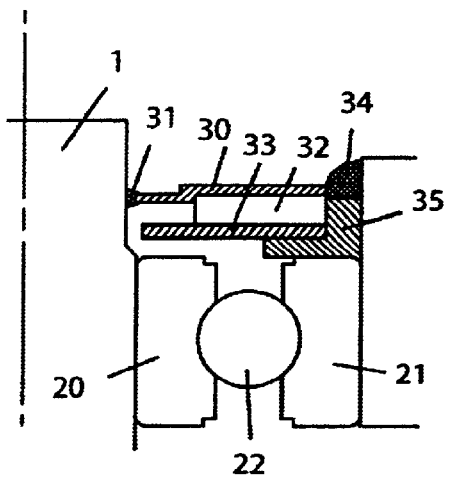
FIG. 13 is a cross-sectional view showing a conventional magnetic fluid seal.

In FIG. 12, another embodiment of a ball bearing with a fluid seal is shown. This fluid seal comprises an annular plate 24 having an annular sealing surface 271 defining a flat cross section with respect to the shaft axis, and a ball bearing in which the outer sealing surface of the inner ring 21 thereof forms a cross-sectional convex shape. That is this ball bearing with a fluid seal has a simpler structure than that shown in FIG. 10.

The above-described minute gap in the fluid seal of the ball bearing may have any of the various structures described above in connection with FIGS. 1 through 9 and of the embodiments corresponding to these drawings. The operation and effects of the minute gaps are the same as those of the corresponding fluid seals.

This ball bearing with a fluid seal may also be used in a rotating-shaft type spindle motor. In this case, since the centrifugal force acting on a fluid is much smaller than in the case of a fixed-shaft type spindle motor, a fluid seal capable of maintaining a high barrier pressure of the seal even with respect to very high-speed rotation can be attained.

Also a fluid seal built in a ball bearing may comprise an annular plate extending generally parallel to the shaft axis, which is fixed to the inner ring, and the outer sealing surface of the annular plate confronts the inner surface of the outer ring to define a minute gap therebetween, and comprise a sealing portion formed in the gap that is filled with fluid.

Moreover, by employing the spindle motor using the above-described fluid seal and ball bearing with the fluid seal, it is possible to realize a disk drive capable of stably maintaining a sealing capability even under very high-speed rotational conditions.

While the invention has been described in its preferred embodiments, obviously many modifications and variations of the present invention are possible in the light of the above teachings. It is therefore to be understood that within the scope of the appended claims, the invention may be practiced otherwise than as specifically described.

What is claimed is:

1. A fluid seal for use in a spindle motor to prevent contaminates from within the motor from flowing out of the motor, the motor comprising a shaft having a longitudinal axis and an outer sealing surface, a hub being rotatable about the axis, first and second bearings located between the shaft and the hub, and the fluid seal being disposed adjacent to at least one of the first and second bearings, the fluid seal comprising:

an annular body supported by the hub and defining an annular sealing surface generally facing the outer sealing surface of the shaft and extending in the axial direction thereof, the annular body defining an exterior surface on one side of the body and an interior surface axially spaced from the exterior surface on an approximately opposite side of the body, the annular sealing surface extending between the exterior surface and the interior surface, and being radially spaced at a predetermined distance from the outer sealing surface of the shaft to define an annular gap therebetween; and a fluid received within the gap and contacting both the outer sealing surface of the shaft and the annular sealing surface of the annular body, and remaining therebetween during rotation of the hub to thereby form a barrier to the passage of contaminates through the annular gap, wherein:

the annular sealing surface of the annular body defines a first central portion and a first outer end; and the outer sealing surface of the shaft confronting the annular sealing surface defines a second central portion and a second outer end;

wherein at least one of the shaft and the annular body are dimensioned and configured such that the distance as measured between the first outer end and the second outer end is greater than that measured between the first central portion and the second central portion to thereby define an angled seal structure.

2. A fluid seal according to claim 1, wherein the annular body is formed of one-piece construction.

3. A fluid seal according to claim 1, wherein the annular body is composed of a single material.

4. A fluid seal according to claim 1, wherein the annular body defines an annular plate.

5. A fluid seal according to claim 1, wherein the fluid is lubricating oil.

6. A fluid seal according to claim 1, wherein the distance gradually increases from that measured between the first central portion and the second central portion to that measured between the first outer end and the second outer end moving in a direction from the first and second central portions to the first and second outer ends.

7. A fluid seal according to claim 1, wherein the outer sealing surface of the shaft defines an angled surface contour extending outwardly of the shaft to form the angled seal structure.

8. A fluid seal according to claim 1, wherein the annular sealing surface of the annular body defines an angled surface contour extending inwardly on the annular body to form the angled seal structure.

9. A fluid seal according to claim 1, wherein the annular sealing surface of the annular body defines a pair of angled walls forming the angled seal structure.

10. A fluid seal according to claim 1, wherein the annular body further defines a pair of axially spaced annular wall portions extending from the annular sealing surface.

11. A fluid seal according to claim 10, wherein the annular sealing surface comprises a pair of outer annular ends, and the annular wall portions each extend from adjacent to a respective outer end.

12. A fluid seal according to claim 10, wherein each of the wall portions define an outer end and a radial distance as measured from the axis of the shaft to an end of one wall portion is greater than a radial distance as measured from the axis of the shaft to an end of the other wall portion.

13. A fluid seal according to claim 1, wherein at least one of the outer sealing surface of the shaft and the annular sealing surface of the annular body is configured to form a shape selected from the group including a semicircle and a semiellipse.

14. A fluid seal, for use in a spindle motor to prevent contaminates from within the motor from flowing out of the motor, the motor comprising a shaft having a longitudinal axis and an outer sealing surface, a hub being rotatable about the axis, first and second bearings located between the shaft and the hub, and the fluid seal being disposed adjacent to at least one of the first and second bearings, the fluid seal comprising:

an annular body supported by the hub and defining an annular sealing surface generally facing the outer sealing surface of the shaft and extending in the axial direction thereof, the annular body defining an exterior surface on one side of the body and an interior surface axially spaced from the exterior surface on an approximately opposite side of the body, the annular sealing surface extending between the exterior surface and the interior surface, and being radially spaced at a predetermined distance from the outer sealing surface of the shaft to define an annular gap therebetween; and a fluid received within the gap and contacting both the outer sealing surface of the shaft and the annular sealing surface of the annular body, and remaining therebetween during rotation of the hub to thereby form a barrier to the passage of contaminates through the annular gap, wherein the annular sealing surface of the annular body defines at least one outer end, the outer sealing surface of the shaft defines an annular, approximately convex portion defining an outermost point, the outermost point defines a radial distance as measured from the axis of the shaft that is substantially equal to or greater than a radial distance as measured from the axis of the shaft to the outer end of the annular sealing surface of the shaft.

15. A fluid seal, for use in a spindle motor to prevent contaminates from within the motor from flowing out of the motor, the motor comprising a shaft having a longitudinal axis and an outer sealing surface, a hub being rotatable about the axis, first and second bearings located between the shaft and the hub, and the fluid seal being disposed adjacent to at least one of the first and second bearings, the fluid seal comprising:

an annular body supported by the hub and defining an annular sealing surface generally facing the outer sealing surface of the shaft and extending in the axial direction thereof, the annular body defining an exterior surface on one side of the body, an interior surface axially spaced from the exterior surface on an approximately opposite side of the body, and a pair of axially spaced annular wall portions extending from the annular sealing surface, the annular sealing surface extending between the exterior surface and the interior surface, and being radially spaced at a predetermined distance from the outer sealing surface of the shaft to define an annular gap therebetween; and a fluid received within the gap and contacting both the outer sealing surface of the shaft and the annular sealing surface of the annular body, and remaining therebetween during rotation of the hub to thereby form a barrier to the passage of contaminates through the annular gap, wherein:

at least one of the wall portions of the annular sealing surface of the annular body defines an approximately convex, angular surface configuration having an outermost point, and the outer sealing surface of the shaft defines an approximately convex, angular surface configuration having an outermost point; and a radial distance as measured from the axis of the shaft to the outermost point of the at least one wall portion is substantially equal to or less than a radial distance as measured from the axis of the shaft to the outermost point of the outer sealing surface of the shaft.

16. A motor comprising:
a shaft having an axis and defining an outer sealing surface;
a hub rotatably disposed about the shaft and having an inner surface;
first and second bearings, each bearing having an inner ring fixed to the shaft and an outer ring fixed to the inner surface of the hub;
a fluid seal disposed adjacent to at least one of the first and second bearings, the fluid seal comprising:

an annular body supported by the hub and defining an annular sealing surface generally facing the outer sealing surface of the shaft and extending in the axial direction thereof, the annular body defining an exterior surface on one side of the body and an interior surface spaced axially from the exterior surface on an approximately opposite side of the body, the annular sealing surface extending between the exterior surface and the interior surface, and being radially spaced at a predetermined distance from the outer surface of the shaft to define an annular gap therebetween; and a fluid received within the gap and contacting both the outer sealing surface of the shaft and the annular sealing surface of the annular body, and remaining therebetween during rotation of the hub to thereby form a barrier to the passage of contaminates through the annular gap, wherein:

the annular sealing surface of the annular body defines a first central portion and a first outer end; and the outer sealing surface of the shaft confronting the annular sealing surface defines a second central portion and a second outer end:

wherein at least one of the shaft and the annular body are dimensioned and configured such that the distance as measured between the first outer end and the second outer end is greater than that measured between the first central portion and the second central portion to thereby define an angled seal structure.

17. A motor comprising:
a shaft having an axis and an outer sealing surface;
a hub rotatably disposed about the shaft and having an inner surface;
a first and a second bearing, each bearing having an inner ring fixed to the shaft and an outer ring fixed to the inner surface of the hub;
a fluid seal disposed adjacent to at least one of the first and second bearings, the fluid seal comprising:

an annular body fixed to the outer ring of the bearing and defining an annular sealing surface generally facing the outer sealing surface of the shaft and extending in the axial direction thereof, the annular body defining an exterior surface on one side of the body and an interior surface spaced axially from the exterior surface on an approximately opposite side of the body, the annular sealing surface extending between the exterior surface and the interior surface and being radially spaced at a predetermined distance from the outer surface of the shaft to define an annular gap therebetween; and a fluid received within the gap and contacting both the outer sealing surface of the shaft and the annular sealing surface of the annular body, and remaining therebetween during rotation of the hub to thereby form a barrier to the passage of contaminates therethrough, wherein:

the annular sealing surface of the annular body defines a first central portion and a first outer end; and the outer sealing surface of the shaft confronting the annular sealing surface defines a second central portion and a second outer end;

wherein at least one of the shaft and the annular body are dimensioned and configured such that the distance as measured between the first outer end and the second outer end is greater than that measured between the first central portion and the second central portion to thereby define an angled seal structure.

18. A fluid seal for use in a spindle motor to prevent contaminates from flowing out of the motor, comprising:

a shaft having an axis and an outer sealing surface;

a hub rotatably disposed about the shaft and having an inner surface;

a first bearing and a second bearing disposed between the shaft and the hub;

a fluid seal disposed adjacent to at least one of the first and second bearings, the fluid seal comprising:

an annular body fixed to the outer ring of the bearing and defining an annular sealing surface generally facing the outer sealing surface of the shaft and extending in the axial direction thereof, the annular body defining an exterior surface on one side of the body and an interior surface spaced axially from the exterior surface on approximately an opposite side of the body, the annular sealing surface extending between the exterior surface and the interior surface, and being radially spaced at a predetermined distance from the outer surface of the shaft to define an annular gap therebetween; and a fluid being received within the gap and contacting the outer sealing surface of the shaft and the annular sealing surface of the annular body, wherein:

the annular sealing surface of the annular body defines a first central portion and a first outer end; and the outer sealing surface of the shaft confronting the annular sealing surface defines a second central portion and a second outer end;

wherein at least one of the shaft and the annular body are dimensioned and configured such that the distance as measured between the first outer end and the second outer end is greater than that measured between the first central portion and the second central portion to thereby define an angled seal structure.

19. A disk drive having a disk for storing information in a digital format, comprising:

a housing;

a head assembly including a head for reading and writing information from or to the disk, an arm for supporting the head, and an actuator for moving the head and the arm to a required position; and a motor comprising:

a shaft having an axis and defining an outer sealing surface;

a hub rotatably disposed about the shaft and having an inner surface;

first and second bearings, each bearing having an inner ring fixed to the shaft and an outer ring fixed to the inner surface of the hub;

a fluid seal being disposed adjacent to at least one of the first and second bearings, the fluid seal comprising:

an annular body being supported by the hub and defining an annular sealing surface generally facing the outer sealing surface of the shaft and extending in the axial direction thereof, the annular body defining an exterior surface on one side of the body and an interior surface spaced axially from the exterior surface on an approximately opposite side of the body, the annular sealing surface extending between the exterior surface and the interior surface and being radially spaced at a predetermined distance from the shaft to define an annular gap therebetween; and a fluid received within the gap and contacting both the outer sealing surface of the shaft and the annular sealing surface of the annular body, and remaining therebetween during rotation of the hub to thereby form a barrier to the passage of contaminates through the annular gap, wherein:

the annular sealing surface of the annular body defines a first central portion and a first outer end; and the outer sealing surface of the shaft confronting the annular sealing surface defines a second central portion and a second outer end;

wherein at least one of the shaft and the annular body are dimensioned and configured such that the distance as measured between the first outer end and the second outer end is greater than that measured between the first central portion and the second central portion to thereby define an angled seal structure.

* * * * *